US011990135B2

(12) United States Patent
Willett et al.

(10) Patent No.: US 11,990,135 B2
(45) Date of Patent: *May 21, 2024

(54) METHODS AND APPARATUS FOR HYBRID SPEECH RECOGNITION PROCESSING

(71) Applicant: Microsoft Technology Licensing, LLC, Redmond, WA (US)

(72) Inventors: Daniel Willett, Walluf (DE); Joel Pinto, Aachen (DE); William F. Ganong, III, Brookline, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/171,513

(22) Filed: Feb. 9, 2021

(65) Prior Publication Data

US 2021/0166699 A1 Jun. 3, 2021

Related U.S. Application Data

(63) Continuation of application No. 15/403,762, filed on Jan. 11, 2017, now Pat. No. 10,971,157.

(51) Int. Cl.
*G10L 15/30* (2013.01)
*G10L 15/00* (2013.01)
*G10L 15/18* (2013.01)

(52) U.S. Cl.
CPC ............ *G10L 15/30* (2013.01); *G10L 15/005* (2013.01); *G10L 15/1815* (2013.01)

(58) Field of Classification Search
None
See application file for complete search history.

(56) References Cited

U.S. PATENT DOCUMENTS 4,712,189 A 12/1987 Mohri
5,054,082 A 10/1991 Smith et al.
(Continued)

FOREIGN PATENT DOCUMENTS

CN 1764945 A 4/2006
CN 101971251 A 2/2011
(Continued)

OTHER PUBLICATIONS

Extended European Search Report for European Application No. 15899045.7 dated Feb. 18, 2019.
(Continued)

*Primary Examiner* — Neeraj Sharma
(74) *Attorney, Agent, or Firm* — Foley IP Law, PLLC

(57) ABSTRACT

Methods and apparatus for selectively performing speech processing in a hybrid speech processing system. The hybrid speech processing system includes at least one mobile electronic device and a network-connected server remotely located from the at least one mobile electronic device. The mobile electronic device is configured to use an embedded speech recognizer to process at least a portion of input audio to produce recognized text. A controller on the mobile electronic device determines whether to send information from the mobile electronic device to the server for speech processing. The determination of whether to send the information is based, at least in part, on an analysis of the input audio, the recognized text, or a semantic category associated with the recognized text.

20 Claims, 4 Drawing Sheets

(56) References Cited

U.S. PATENT DOCUMENTS

| | | |
|---|---|---|
| 5,148,471 A | 9/1992 | Metroka et al. |
| 5,297,183 A | 3/1994 | Bareis et al. |
| 5,544,228 A | 8/1996 | Wagner et al. |
| 5,594,789 A | 1/1997 | Seazholtz et al. |
| 5,632,002 A | 5/1997 | Hashimoto et al. |
| 5,638,425 A | 6/1997 | Meador, III et al. |
| 5,774,857 A | 6/1998 | Newlin |
| 5,839,106 A * | 11/1998 | Bellegarda .......... G10L 15/1815 704/E15.024 |
| 5,855,003 A | 12/1998 | Ladden et al. |
| 5,943,648 A | 8/1999 | Tel |
| 5,953,700 A | 9/1999 | Kanevsky et al. |
| 5,956,683 A | 9/1999 | Jacobs et al. |
| 5,960,399 A | 9/1999 | Barclay et al. |
| 6,078,886 A | 6/2000 | Dragosh et al. |
| 6,088,732 A | 7/2000 | Smith et al. |
| 6,094,680 A | 7/2000 | Hokanson |
| 6,098,041 A | 8/2000 | Matsumoto |
| 6,119,087 A | 9/2000 | Kuhn et al. |
| 6,122,613 A | 9/2000 | Baker |
| 6,173,259 B1 | 1/2001 | Bijl et al. |
| 6,185,535 B1 | 2/2001 | Hedin et al. |
| 6,188,985 B1 | 2/2001 | Thrift et al. |
| 6,195,641 B1 | 2/2001 | Loring et al. |
| 6,216,013 B1 | 4/2001 | Moore et al. |
| 6,282,268 B1 | 8/2001 | Hughes et al. |
| 6,282,508 B1 | 8/2001 | Kimura et al. |
| 6,327,568 B1 | 12/2001 | Joost |
| 6,363,348 B1 | 3/2002 | Besling et al. |
| 6,366,886 B1 | 4/2002 | Dragosh et al. |
| 6,374,226 B1 | 4/2002 | Hunt et al. |
| 6,408,272 B1 | 6/2002 | White et al. |
| 6,424,945 B1 | 7/2002 | Sorsa |
| 6,434,523 B1 | 8/2002 | Monaco |
| 6,453,290 B1 | 9/2002 | Jochumson |
| 6,456,974 B1 | 9/2002 | Baker et al. |
| 6,487,534 B1 | 11/2002 | Thelen et al. |
| 6,505,159 B1 | 1/2003 | Theodore |
| 6,560,590 B1 | 5/2003 | Shwe et al. |
| 6,594,628 B1 | 7/2003 | Jacobs et al. |
| 6,604,075 B1 | 8/2003 | Brown et al. |
| 6,604,077 B2 | 8/2003 | Dragosh et al. |
| 6,615,171 B1 | 9/2003 | Kanevsky et al. |
| 6,615,172 B1 | 9/2003 | Bennett et al. |
| 6,671,669 B1 | 12/2003 | Garudadri et al. |
| 6,738,743 B2 | 5/2004 | Sharma et al. |
| 6,760,705 B2 | 7/2004 | Dvorak |
| 6,832,380 B1 | 12/2004 | Lau et al. |
| 6,898,567 B2 | 5/2005 | Belasuriya |
| 6,912,588 B1 | 6/2005 | Jardin et al. |
| 6,963,759 B1 | 11/2005 | Gerson |
| 6,996,520 B2 | 2/2006 | Levin |
| 7,003,463 B1 | 2/2006 | Maes et al. |
| 7,024,363 B1 | 4/2006 | Comerford et al. |
| 7,050,977 B1 | 5/2006 | Bennett |
| 7,058,643 B2 | 6/2006 | Vailaya |
| 7,058,890 B2 | 6/2006 | George et al. |
| 7,099,824 B2 | 8/2006 | Kushida et al. |
| 7,137,126 B1 | 11/2006 | Coffman et al. |
| 7,366,673 B2 | 4/2008 | Ruback et al. |
| 7,389,234 B2 | 6/2008 | Schmid et al. |
| 7,418,382 B1 | 8/2008 | Maes |
| 7,519,536 B2 | 4/2009 | Maes et al. |
| 7,610,204 B2 | 10/2009 | Ruback et al. |
| 7,647,225 B2 | 1/2010 | Bennett et al. |
| 7,716,051 B2 | 5/2010 | Dow et al. |
| 7,729,916 B2 | 6/2010 | Coffman et al. |
| 7,933,777 B2 | 4/2011 | Koll |
| 7,983,911 B2 | 7/2011 | Soufflet et al. |
| 8,082,153 B2 | 12/2011 | Coffman et al. |
| 8,200,516 B2 | 6/2012 | Tomioka et al. |
| 8,209,184 B1 | 6/2012 | Dragosh et al. |
| 8,332,227 B2 | 12/2012 | Maes et al. |
| 8,370,159 B2 | 2/2013 | Lee et al. |
| 8,442,811 B1 * | 5/2013 | Broniek ............... G06F 40/58 704/235 |
| 8,635,243 B2 | 1/2014 | Phillips et al. |
| 8,644,803 B1 | 2/2014 | Fox |
| 8,660,847 B2 | 2/2014 | Soemo et al. |
| 8,775,157 B2 | 7/2014 | Abdel-Kader |
| 8,825,468 B2 | 9/2014 | Jacobsen et al. |
| 8,868,425 B2 | 10/2014 | Maes et al. |
| 8,892,439 B2 | 11/2014 | Odell et al. |
| 8,898,065 B2 | 11/2014 | Newman et al. |
| 8,930,194 B2 | 1/2015 | Newman et al. |
| 8,949,266 B2 | 2/2015 | Phillips et al. |
| 9,002,710 B2 | 4/2015 | Carus et al. |
| 9,065,914 B2 | 6/2015 | Dragosh et al. |
| 9,159,315 B1 | 10/2015 | Mengibar et al. |
| 9,183,843 B2 | 11/2015 | Fanty et al. |
| 9,196,252 B2 | 11/2015 | Ruback et al. |
| 9,263,058 B2 | 2/2016 | Huang et al. |
| 9,293,137 B2 | 3/2016 | Kawamura et al. |
| 9,384,736 B2 | 7/2016 | Labsky et al. |
| 9,535,906 B2 | 1/2017 | Lee et al. |
| 9,704,486 B2 | 7/2017 | Basye et al. |
| 9,761,241 B2 | 9/2017 | Maes et al. |
| 9,886,944 B2 | 2/2018 | Willett et al. |
| 9,953,653 B2 | 4/2018 | Newman et al. |
| 9,997,160 B2 | 6/2018 | Schmidt |
| 10,032,455 B2 | 7/2018 | Newman et al. |
| 10,049,669 B2 | 8/2018 | Newman et al. |
| 10,054,327 B2 | 8/2018 | Nelson et al. |
| 10,325,590 B2 | 6/2019 | Deisher et al. |
| 10,388,277 B1 * | 8/2019 | Ghosh ................. G10L 15/22 |
| 10,569,652 B2 * | 2/2020 | Akachi ................ G01C 21/36 |
| 10,593,326 B2 * | 3/2020 | Teasley ................ G10L 15/22 |
| 2002/0065656 A1 | 5/2002 | Reding et al. |
| 2002/0065660 A1 | 5/2002 | Cooklev et al. |
| 2002/0072905 A1 | 6/2002 | White et al. |
| 2002/0077811 A1 | 6/2002 | Koenig et al. |
| 2002/0091515 A1 | 7/2002 | Garudadri |
| 2002/0091527 A1 | 7/2002 | Shiau |
| 2003/0004720 A1 | 1/2003 | Garudadri et al. |
| 2003/0046074 A1 | 3/2003 | Ruback et al. |
| 2003/0120486 A1 * | 6/2003 | Brittan ................. G10L 15/32 704/231 |
| 2003/0125955 A1 | 7/2003 | Arnold et al. |
| 2003/0139924 A1 | 7/2003 | Balasuriya |
| 2003/0182131 A1 | 9/2003 | Arnold et al. |
| 2004/0010409 A1 | 1/2004 | Ushida et al. |
| 2004/0030556 A1 | 2/2004 | Bennett |
| 2004/0083109 A1 | 4/2004 | Halonen et al. |
| 2005/0049860 A1 | 3/2005 | Junqua et al. |
| 2005/0131704 A1 | 6/2005 | Dragosh et al. |
| 2006/0009980 A1 | 1/2006 | Burke et al. |
| 2006/0111909 A1 | 5/2006 | Maes et al. |
| 2006/0149551 A1 | 7/2006 | Ganong et al. |
| 2006/0195323 A1 | 8/2006 | Monne et al. |
| 2006/0235684 A1 | 10/2006 | Chang |
| 2007/0011010 A1 | 1/2007 | Dow et al. |
| 2007/0047719 A1 | 3/2007 | Dhawan et al. |
| 2007/0094032 A1 | 4/2007 | Bennett et al. |
| 2007/0276651 A1 | 11/2007 | Bliss et al. |
| 2007/0286099 A1 | 12/2007 | Stocklein et al. |
| 2008/0027723 A1 | 1/2008 | Reding et al. |
| 2008/0126490 A1 | 5/2008 | Ahlenius et al. |
| 2008/0133124 A1 | 6/2008 | Sarkeshik |
| 2008/0154612 A1 | 6/2008 | Evermann et al. |
| 2008/0154870 A1 | 6/2008 | Evermann et al. |
| 2008/0189111 A1 | 8/2008 | Ruback et al. |
| 2009/0018826 A1 | 1/2009 | Berlin |
| 2009/0051649 A1 | 2/2009 | Rondel |
| 2009/0086934 A1 | 4/2009 | Thomas |
| 2009/0204410 A1 | 8/2009 | Mozer et al. |
| 2009/0253463 A1 | 10/2009 | Shin et al. |
| 2009/0287477 A1 | 11/2009 | Maes |
| 2010/0036653 A1 | 2/2010 | Kim et al. |
| 2010/0049521 A1 | 2/2010 | Ruback et al. |
| 2010/0057450 A1 | 3/2010 | Koll |
| 2010/0057451 A1 | 3/2010 | Carraux et al. |
| 2010/0211376 A1 | 8/2010 | Chen et al. |
| 2011/0010168 A1 | 1/2011 | Yu et al. |

(56) References Cited

U.S. PATENT DOCUMENTS

| | | |
|---|---|---|
| 2011/0015928 A1 | 1/2011 | Odell et al. |
| 2011/0029876 A1* | 2/2011 | Slotznick .............. G10L 13/00 |
| | | 715/727 |
| 2011/0054899 A1 | 3/2011 | Phillips et al. |
| 2011/0060587 A1 | 3/2011 | Phillips et al. |
| 2011/0184740 A1 | 7/2011 | Gruenstein et al. |
| 2012/0030712 A1 | 2/2012 | Chang |
| 2012/0035932 A1 | 2/2012 | Jitkoff et al. |
| 2012/0179457 A1 | 7/2012 | Newman et al. |
| 2012/0179463 A1 | 7/2012 | Newman et al. |
| 2012/0179464 A1 | 7/2012 | Newman et al. |
| 2012/0179469 A1 | 7/2012 | Newman et al. |
| 2012/0179471 A1 | 7/2012 | Newman et al. |
| 2012/0253823 A1 | 10/2012 | Schalk et al. |
| 2012/0259623 A1 | 10/2012 | Dragosh et al. |
| 2012/0296644 A1 | 11/2012 | Koll et al. |
| 2013/0006620 A1 | 1/2013 | Maes et al. |
| 2013/0060571 A1 | 3/2013 | Soemo et al. |
| 2013/0085753 A1 | 4/2013 | Bringert et al. |
| 2013/0111530 A1 | 5/2013 | Kitazato |
| 2013/0132069 A1 | 5/2013 | Wouters et al. |
| 2013/0132084 A1* | 5/2013 | Stonehocker .......... G10L 15/04 |
| | | 704/244 |
| 2013/0132089 A1 | 5/2013 | Fanty et al. |
| 2013/0151250 A1* | 6/2013 | VanBlon ............... G10L 15/30 |
| | | 704/235 |
| 2013/0185072 A1 | 7/2013 | Huang et al. |
| 2013/0197915 A1 | 8/2013 | Burke et al. |
| 2014/0052702 A1 | 2/2014 | Fierro et al. |
| 2014/0058732 A1 | 2/2014 | Labsky et al. |
| 2014/0088967 A1 | 3/2014 | Kawamura et al. |
| 2014/0163977 A1 | 6/2014 | Hoffmeister et al. |
| 2014/0163978 A1 | 6/2014 | Basye et al. |
| 2014/0207442 A1 | 7/2014 | Ganong et al. |
| 2014/0337007 A1 | 11/2014 | Waibel et al. |
| 2014/0343948 A1 | 11/2014 | Maes et al. |
| 2014/0379338 A1 | 12/2014 | Fry |
| 2015/0053781 A1 | 2/2015 | Nelson et al. |
| 2015/0120288 A1 | 4/2015 | Thomson et al. |
| 2015/0120290 A1 | 4/2015 | Shagalov |
| 2015/0120296 A1 | 4/2015 | Stern et al. |
| 2015/0206528 A1 | 7/2015 | Wilson et al. |
| 2015/0221319 A1 | 8/2015 | Cartwright et al. |
| 2015/0228274 A1 | 8/2015 | Lappanen et al. |
| 2015/0279352 A1 | 10/2015 | Willett et al. |
| 2015/0281401 A1* | 10/2015 | Le ......................... G06F 40/20 |
| | | 709/203 |
| 2015/0371628 A1 | 12/2015 | Kreifeldt |
| 2016/0019205 A1 | 1/2016 | Kidawi et al. |
| 2016/0078020 A1 | 3/2016 | Sumita et al. |
| 2016/0111090 A1* | 4/2016 | Holdren ................ G10L 15/20 |
| | | 704/251 |
| 2016/0275950 A1* | 9/2016 | Ogawa .................. G10L 15/183 |
| 2016/0314115 A1 | 10/2016 | Windebank et al. |
| 2016/0379626 A1 | 12/2016 | Deisher et al. |
| 2016/0379638 A1 | 12/2016 | Basye et al. |
| 2017/0083285 A1 | 3/2017 | Meyers et al. |
| 2017/0140751 A1* | 5/2017 | Huang ................... G10L 15/30 |
| 2017/0299399 A1* | 10/2017 | Yamaguchi ............ G06F 16/29 |
| 2018/0197545 A1 | 7/2018 | Willett et al. |
| 2018/0211668 A1 | 7/2018 | Willett et al. |

FOREIGN PATENT DOCUMENTS

| | | |
|---|---|---|
| EP | 0 450 610 A2 | 10/1991 |
| EP | 0 654 930 A1 | 5/1995 |
| GB | 2325112 A | 11/1998 |
| JP | 09-098221 A | 4/1997 |
| JP | 10-207683 A | 8/1998 |
| JP | 10-214258 A | 8/1998 |
| JP | 10-228431 A | 8/1998 |
| WO | WO 97/47122 A2 | 12/1997 |
| WO | WO 02/103675 A1 | 12/2002 |

OTHER PUBLICATIONS

International Preliminary Report on Patentability for International Application No. PCT/US2012/058613 dated Apr. 16, 2015.
International Search Report and Written Opinion for International Application No. PCT/US2012/058613 dated May 27, 2013.
International Search Report and Written Opinion for International Application No. PCT/US2015/040905 dated Oct. 15, 2015.
Gopalakrishnan et al., Compression of acoustic features for speech recognition in network environments. Proceedings of the 1998 IEEE International Conference on Acoustics, Speech and Signal Processing, ICASSP'98 (Cat. No. 98CH36181). May 15, 1998; 2:977-980.
U.S. Appl. No. 09/882,472, filed Jun. 15, 2001, Ruback et al.
U.S. Appl. No. 12/042,968, filed Mar. 5, 2008, Ruback et al.
U.S. Appl. No. 12/605,704, filed Oct. 26, 2009, Ruback et al.
U.S. Appl. No. 09/806,425, filed Jun. 25, 2001, Maes et al.
U.S. Appl. No. 11/303,768, filed Dec. 16, 2005, Maes et al.
U.S. Appl. No. 12/386,166, filed Apr. 14, 2009, Maes et al.
U.S. Appl. No. 13/610,221, filed Sep. 11, 2012, Maes et al.
U.S. Appl. No. 14/448,216, filed Jul. 31, 2014, Maes et al.
U.S. Appl. No. 11/427,029, filed Jun. 28, 2006, Dow et al.
U.S. Appl. No. 13/345,173, filed Jan. 6, 2012, Newman et al.
U.S. Appl. No. 13/345,198, filed Jan. 6, 2012, Newman et al.
U.S. Appl. No. 13/345,219, filed Jan. 6, 2012, Newman et al.
U.S. Appl. No. 13/345,238, filed Jan. 6, 2012, Newman et al.
U.S. Appl. No. 13/345,265, filed Jan. 6, 2012, Newman et al.
U.S. Appl. No. 16/103,733, filed Aug. 14, 2018, Newman et al.
U.S. Appl. No. 13/746,566, filed Jan. 22, 2013, Fanty et al.
U.S. Appl. No. 14/433,263, filed Apr. 2, 2015, Willett et al.
U.S. Appl. No. 15/889,535, filed Feb. 6, 2018, Willett et al.
U.S. Appl. No. 15/745,523, filed Jan. 17, 2018, Willett et al.
U.S. Appl. No. 15/403,762, filed Jan. 11, 2017, Willett et al.

* cited by examiner

METHODS AND APPARATUS FOR HYBRID SPEECH RECOGNITION PROCESSING

CROSS-REFERENCE TO RELATED APPLICATIONS

This Application claims the benefit under 35 U.S.C. § 120 as a Continuation of U.S. application Ser. No. 15/403,762, entitled "METHODS AND APPARATUS FOR HYBRID SPEECH RECOGNITION PROCESSING", filed Jan. 11, 2017. This application is herein incorporated by reference in its entirety.

BACKGROUND

An automatic speech recognition (ASR) system converts speech into recognized text based on statistical acoustic and language models. An acoustic model represents relationships between portions of the speech input and linguistic units, such as phonemes. A language model represents statistical relationships between words in a language. An ASR system combines the acoustic and language models to determine candidate word sequences for a given speech segment.

Text output from an ASR system is often subjected to natural language understanding (NLU) processing to determine a semantic meaning of the text. The determined semantic meaning can then be used to perform one or more actions on an electronic device with which the ASR/NLU system is associated.

Voice interfaces for mobile electronic devices, which enable a user to use speech including voice commands to interact with components of the device, have become more common in recent years. Examples of functionality provided by voice interfaces include voice-activated dialing, voice-initiated web searching, and voice-based text messaging. The voice interfaces employ ASR and/or NLU processing to interpret speech input to enable such functionality.

ASR/NLU processing may be implemented by one or more processors of the mobile electronic device to perform local or "embedded" ASR/NLU processing, or at least a portion of the ASR/NLU processing may be performed remote from the mobile electronic device by one or more servers, often commonly referred to as "cloud-based" processing. In a distributed or "hybrid" speech processing system, at least some ASR/NLU processing is performed using an embedded ASR/NLU engine and at least some ASR/NLU processing is performed using a server ASR/NLU engine. A local controller on the mobile electronic device may determine, based on various criteria (e.g., policy, confidence score, network availability, etc.), whether to transmit information to the server for processing.

SUMMARY

Some embodiments are directed to a mobile electronic device for use in a hybrid speech processing system comprising the mobile electronic device and a network-connected server remotely located from the mobile electronic device. The mobile electronic device comprises an input interface configured to receive input audio comprising speech, an embedded speech recognizer configured to process at least a portion of the input audio to produce recognized text, a controller configured to determine whether to send information to the server for speech processing, wherein the information includes at least a portion of the input audio and/or at least a portion of the recognized text, wherein the determination of whether to send the information is based, at least in part, on an analysis of the input audio, the recognized text, or a semantic category associated with the recognized text, and a network interface configured to send the information to the server in response to determining that the information should be sent to the server.

Other embodiments are directed to a method for use in a hybrid speech processing system comprising a mobile electronic device and a network-connected server remotely located from the mobile electronic device. The method comprises processing, by an embedded speech recognizer on the mobile electronic device, at least a portion of input audio to produce recognized text, determining, by a controller, whether to send information from the mobile electronic device to the server for speech processing, wherein the information includes at least a portion of the input audio and/or at least a portion of the recognized text, wherein the determination of whether to send the information is based, at least in part, on an analysis of the input audio, the recognized text, or a semantic category associated with the recognized text, and sending the information from the mobile electronic device to the server in response to determining that the information should be sent to the server.

Other embodiments are directed to a non-transitory computer readable medium encoded with a plurality of instructions, that, when executed by at least one controller of a mobile electronic device in a hybrid speech processing system, perform a method. The method comprises processing, by an embedded speech recognizer on the mobile electronic device, at least a portion of input audio to produce recognized text, determining, by a controller, whether to send information from the mobile electronic device to a server in the hybrid speech processing system for speech processing, wherein the information includes at least a portion of the input audio and/or at least a portion of the recognized text, wherein the determination of whether to send the information is based, at least in part, on an analysis of the input audio, the recognized text, or a semantic category associated with the recognized text, and sending the information from the mobile electronic device to the server in response to determining that the information should be sent to the server.

Other embodiments are directed to a server for use in a hybrid speech processing system comprising the server and a network-connected mobile electronic device remotely located from the server, wherein the mobile electronic device comprises an embedded speech recognizer. The server comprises a controller configured to determine based, at least in part, on text received from the mobile electronic device, whether to request speech associated with the text from the mobile electronic device, and request speech associated with the text received from the mobile device in response to determining to request the speech. The server further comprises a server speech recognizer configured to process at least a portion of the speech received from the mobile electronic device to produce recognized text and a network interface configured to send the recognized text to the mobile electronic device.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical

Figure 1:
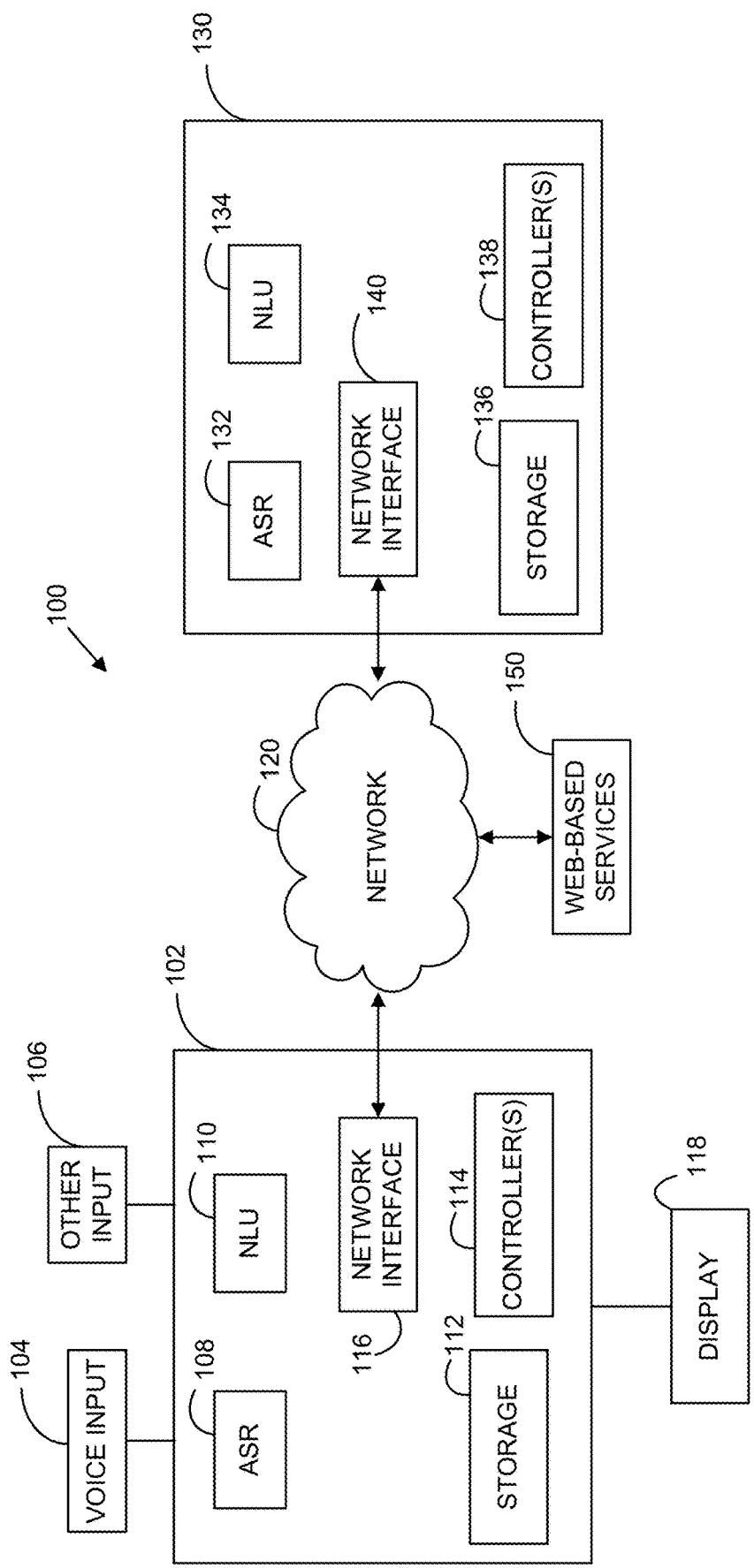
Figure 2:
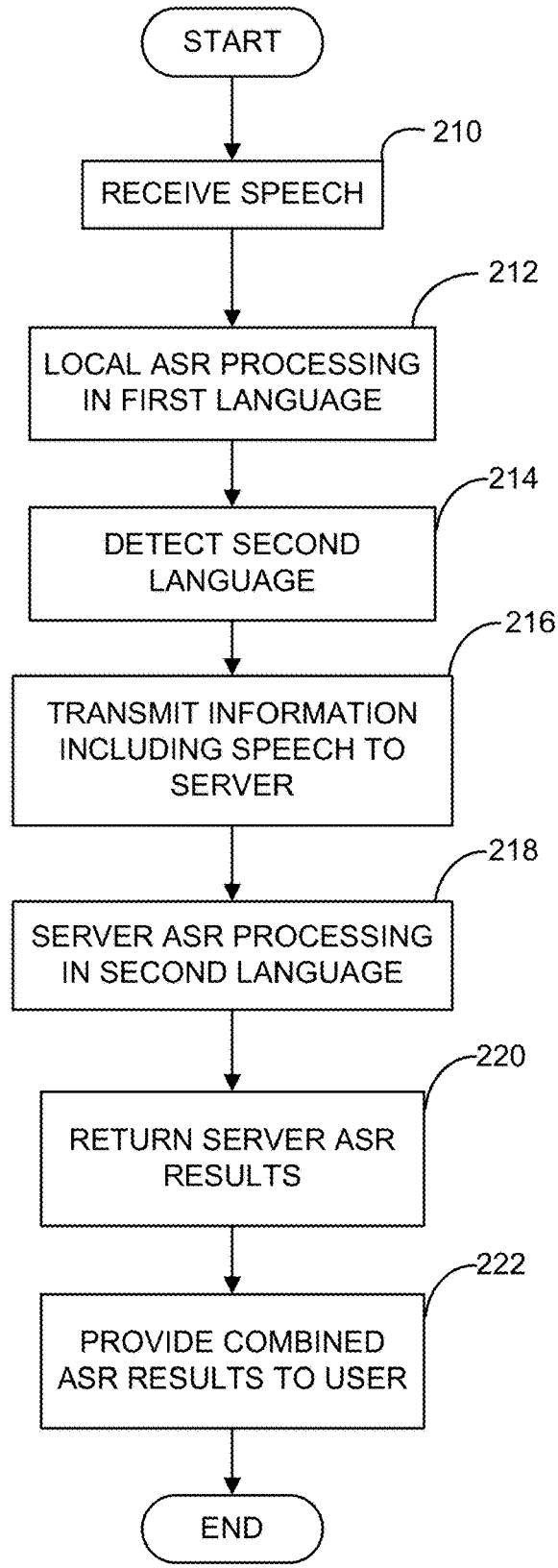
Figure 3:
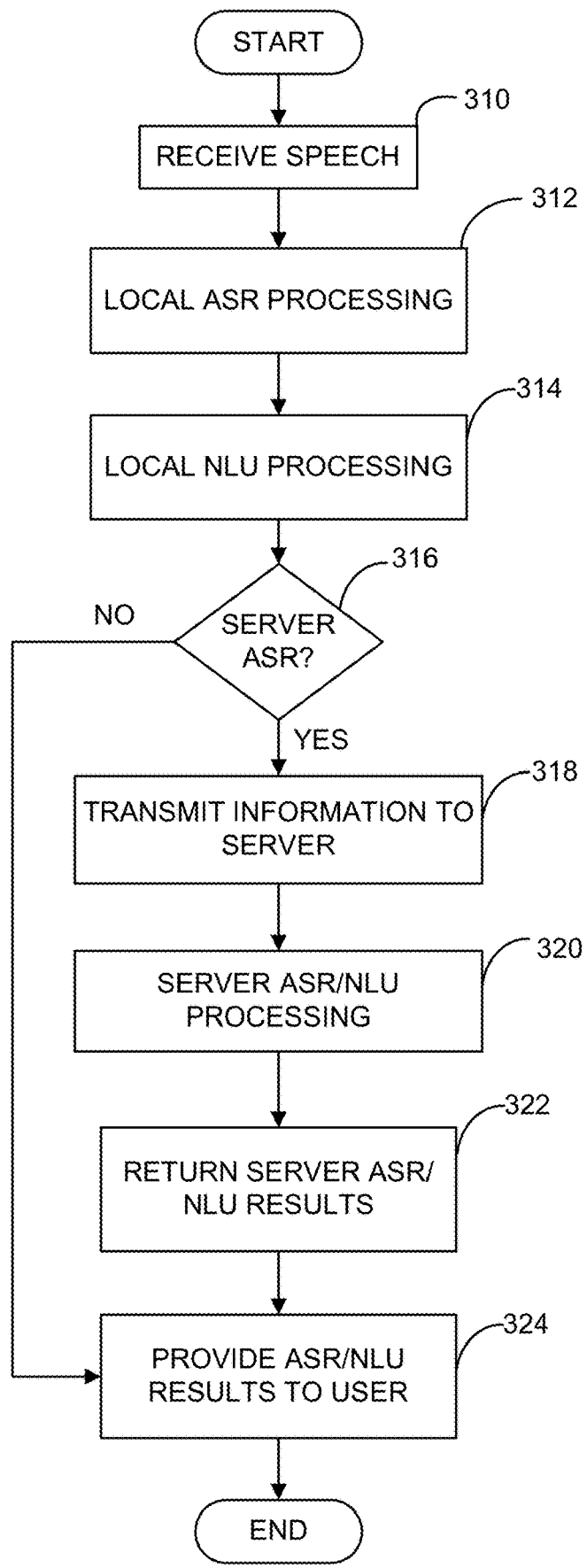
Figure 4:
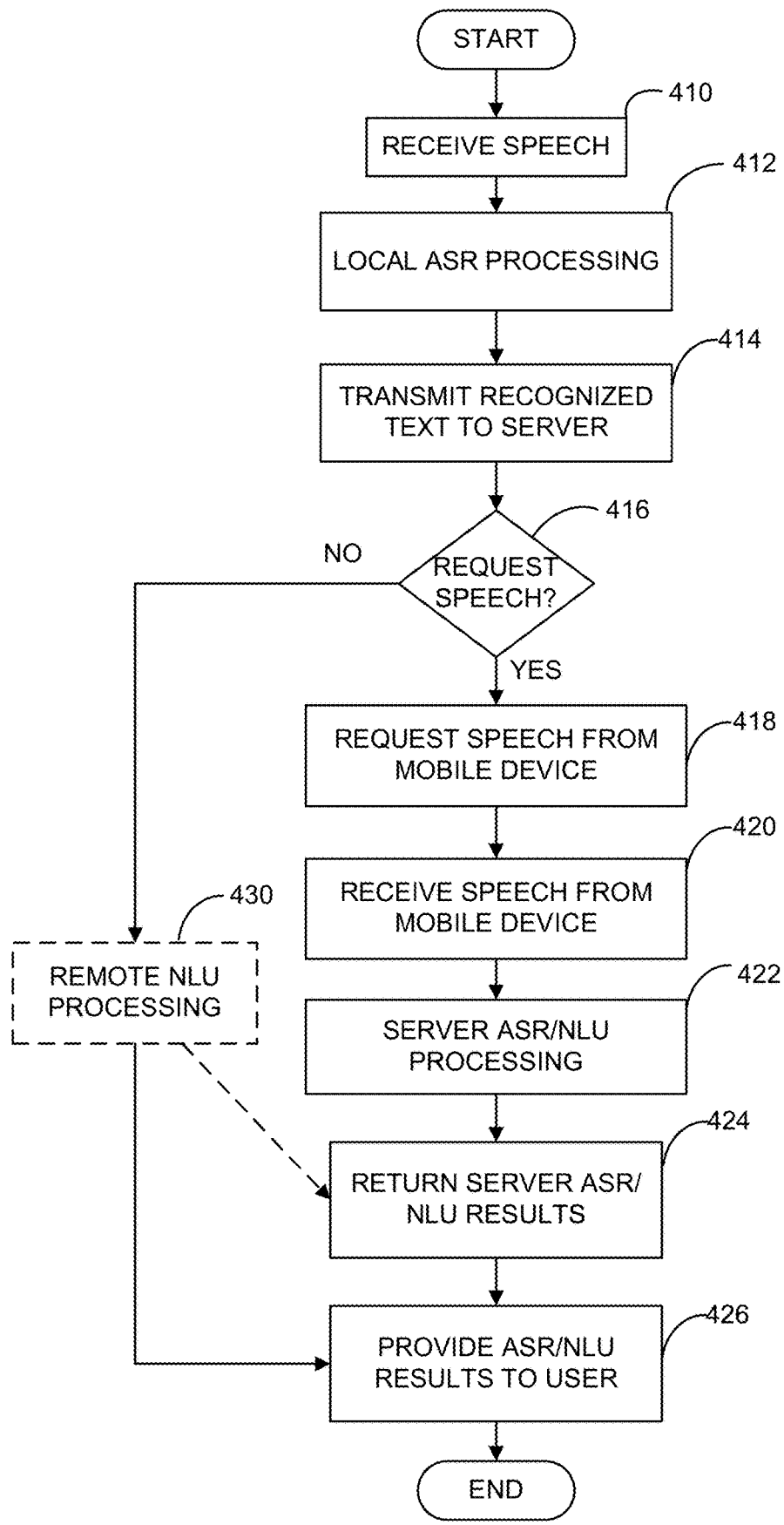

3 component that is illustrated in various figures is represented by a like numeral. For purposes of clarity, not every component may be labeled in every drawing. In the drawings:

FIG. 1 is a block diagram of a hybrid architecture of a speech processing system in accordance with some embodiments;

FIG. 2 is flowchart of a process for performing multilingual ASR in a hybrid speech processing system in accordance with some embodiments;

FIG. 3 is a flowchart of a process for selectively providing speech to a server in a hybrid speech processing system in accordance with some embodiments; and FIG. 4 is a flowchart of a process for implementing a hybrid controller in a hybrid speech processing system in accordance with some embodiments.

DETAILED DESCRIPTION

When a speech-enabled mobile electronic device, such as a smartphone, receives speech input from a user, an ASR engine is often used to process the input speech to determine what the user has said. A mobile electronic device may include embedded ASR functionality that performs speech recognition locally on the device or at least a portion of the ASR processing may be performed remote from the device (e.g., by one or more networked servers). Performing local speech recognition on the device enables ASR results to be generated quickly by avoiding delays associated with transferring audio to a server ASR engine for processing. Processing power and/or memory storage limitations of some mobile electronic devices limit the ability of some mobile electronic devices to perform ASR locally on the device. The larger memory and/or processing resources often associated with server ASR implementations may facilitate speech recognition by providing a larger and/or more up-to-date dictionary of words that may be recognized and/or by using more complex and/or more up-to-date speech recognition models than can be implemented on the local device.

A "hybrid" ASR system includes both embedded and server ASR engines and one or more programmed controllers that determine whether and when to send audio received by a mobile electronic device to the server ASR engine for processing. FIG. 1 schematically illustrates components of a hybrid speech recognition (SR) system 100 in accordance with some embodiments. Hybrid SR system 100 includes a mobile electronic device 102 that is configured to receive speech via voice input interface 104. Electronic device 102 may be any speech-enabled mobile electronic device, examples of which include a cellular phone, smart phone, personal digital assistant (PDA), laptop computer, tablet computer, or handset device. This list is not exhaustive, as the aspects of the invention described herein can be used with any type of electronic device. An exemplary voice input interface 104 may be a microphone, e.g., manufactured as part of electronic device 102 or externally connected to an input jack of electronic device 102. Electronic device 102 may also include one or more other user interface inputs 106 that enable a user to interact with electronic device 102. For example, other inputs 106 may include, but are not limited to, a keyboard, a touch screen, and one or more buttons or switches connected to electronic device 102. Input speech received via voice input interface 104 may be encoded and stored in storage 112 implemented as one or more storage devices. For example, input audio may be encoded using Pulse Code Modulation (PCM), which digitally represents the sampled input audio signal. However, it should be

4 appreciated that input audio may be encoded and stored in any other suitable format, as the aspects of the invention are not limited in this respect.

Electronic device 102 includes embedded ASR engine 108 configured to perform local speech recognition on audio stored in storage 112. Embedded ASR engine 108 may be configured to perform speech recognition using one or more acoustic models, language models and/or speech recognition techniques, as aspects of the invention are not limited by the specific implementation of the embedded ASR engine. Storage 112 may be configured to store one or more dictionaries or vocabularies that embedded ASR engine may access to facilitate speech recognition. For example, storage 112 may include a phoneme dictionary that stores phoneme to grapheme conversion information to enable embedded ASR engine 108 to map audio representations to textual representations. Storage 112 may, in some embodiments, store a plurality of voice commands that electronic device 102 is configured to recognize such as "call," "text," etc., and the embedded ASR engine may access the stored voice commands as part of a speech recognition process. Storage 112 may also include personal information associated with one or more users of electronic device 102. For example, storage 112 may include a contact list, recent call list, task list, calendar information, or any other information associated with electronic device 102 and/or a user of electronic device 102. In some embodiments, embedded ASR engine 108 may be configured to access at least some of the stored personal information to facilitate speech recognition. For example, the entries in a contact list on a smartphone may be used by the embedded ASR engine to restrict the possible recognition results following the commands "call," "dial," or "text."

Mobile electronic device 102 includes embedded natural language understanding (NLU) engine 110 arranged to perform NLU processing on at least a portion of the text output from embedded ASR engine 108. In some embodiments, NLU engine 110 may process partial ASR results output from embedded ASR engine 108 to determine an NLU result, and a decision whether to transfer audio to a remote ASR engine for processing may be determined, based, at least in part, on the NLU result.

Mobile electronic device 102 includes one or more controllers 114 configured to execute a plurality of computer-readable instructions stored, for example, in storage 112. For example, controller(s) 114 may be configured to execute computer-readable instructions that present a user interface on display 118 and to determine how to interpret user interactions with the user interface. It should be appreciated that controller(s) 114 may be configured to perform any other suitable processing functions including, but not limited to, determining whether and/or when to send information to a server ASR engine for processing, as described in more detail below.

Exemplary hybrid SR system 100 also includes a remote server 130 configured to perform speech processing. Although shown as a single server, it should be appreciated that remote server 130 may be implemented as one or more servers, and embodiments are not limited in this respect. Remote server 130 is connected to mobile electronic device 102 via a communication medium, which is shown in FIG. 1 as network 120 (which may be a wireless and/or wired network). Remote server 130 includes network interface 140 configured to receive audio and other information from electronic device 102 via network 120. Remote server 130 also includes server ASR engine 132 configured to perform speech recognition on audio received from mobile electronic device 102 and server NLU engine 134 configured to perform NLU processing on text output from server ASR engine 132 and/or embedded ASR engine 108. Server 130 is shown as being capable of performing both ASR and NLU processing. However, in some embodiments, server 130 may be configured to perform only ASR or NLU processing. Alternatively, server 130 may be implemented by multiple computers, each of which is configured to perform ASR processing, NLU processing, or both ASR processing and NLU processing.

Mobile electronic device 102 also includes network interface 116 configured to establish a network connection with remote server 130 over network 120 to transmit information including, but not limited to, received audio and text output from embedded ASR engine 108, to remote server 130. In some embodiments, audio transmitted from electronic device 102 to server 130 for processing by server ASR engine 132 may be compressed prior to transmission to ensure that the audio data fits in the data channel bandwidth of network 120. In addition to storing encoded input audio (e.g., encoded using PCM) in storage 112, some embodiments also store compressed audio in storage 112. Audio may be compressed using a compression codec that is optimized for speech or take any other form. For example, the compressed audio may be the output of a digital signal processing (DSP) component of electronic device 102 that is used to compress audio data for sending voice calls over a voice channel of a mobile telephone network. In some electronic devices 102, access to hardware compression of audio from the DSP may not be made available to application providers or vendors that provide the ASR capability for the electronic device. In some embodiments that may be used with such electronic devices, the encoded input audio stored in storage 112 may be used in combination with one or more software encoding methods (e.g., executing on controller(s) 114) to provide compressed audio that may be transmitted to remote server 130 for speech recognition processing. Any other suitable compression process may be also be used and embodiments are not limited by any particular compression method.

In addition to server ASR engine 132 and server NLU engine 134, remote server 130 includes storage 136 that may be accessed by server ASR engine 132 and/or server NLU engine 134 to facilitate speech processing. For example, storage 136 may be configured to store larger speech recognition vocabularies and/or more complex speech recognition models for use by server ASR engine 132 than those employed by embedded ASR engine 108. Although not illustrated in FIG. 1, server 130 may include other components that facilitate recognition of received audio including, but not limited to, a vocoder for decompressing the received audio and/or compressing the ASR results, NLU results, or other information transmitted back to electronic device 102. Additionally, in some embodiments server ASR engine 132 may include one or more acoustic or language models trained to recognize audio data received from a particular type of codec, so that the ASR engine may be particularly tuned to receive audio processed by those codecs.

Rather than relying on either the embedded ASR engine or the server ASR engine to provide the entire speech recognition result for an audio input (e.g., an utterance), some embodiments use both the embedded ASR engine 108 and the server ASR engine 132 to process a portion or all of the same input audio, either simultaneously or with the server ASR engine 132 lagging due to the time required to transmit the audio to the remote server 130 over network 120. ASR results output from the embedded ASR engine 108 or the server ASR engine 132 may be selected as the recognition result or the ASR results output from the multiple recognizers may be combined to facilitate speech recognition and/or to effectuate a collective action corresponding to the recognized input speech. To this end, some embodiments are directed to processing audio received by an electronic device at least partially in parallel by multiple recognizers including an embedded recognizer and a server recognizer and consolidating the recognition results into one or more unified actions that application(s) executing on the electronic device should take in response to the received audio.

As shown, also connected to network 120 is one or more computers that perform web-based services 150. Web-based services include, but are not limited to, navigation-based services, web search services, transcription services, and translation services. One or both of mobile electronic device 102 and server 130 may be configured to communicate with web-based services computer(s) 150 over network 120 to request performance of the web-based services using, at least in part, ASR results and/or NLU results generated by the embedded and/or server ASR or NLU engines.

In the illustrative configuration shown in FIG. 1, a single electronic device 102 and server ASR engine 132 is shown. However it should be appreciated that in some embodiments, a larger network is contemplated that may include multiple (e.g., hundreds or thousands or more) of electronic devices have speech processing requests serviced by any number of servers.

Some embodiments are directed to techniques for determining, in a hybrid SR architecture, when to send information including speech from a speech-enabled mobile electronic device to a server ASR engine for recognition processing. As discussed above, a mobile electronic device may include one or more controllers programmed to determine whether to send speech to a remote server ASR engine for processing or whether processing by an embedded ASR engine is likely to provide sufficient results. Some speech recognition tasks may be adequately handled by an embedded ASR engine of a client device, whereas other speech recognition tasks may benefit more from using a server ASR engine. For example, in some embodiments, the embedded ASR engine may be able to recognize speech associated with command and control tasks and voice-activated dialing (VAD) tasks, while the server ASR engine may be required or preferred for other types of tasks such as dictation tasks or the determining the content of a search query or text message. It should be appreciated that this breakdown of tasks for embedded versus server ASR is exemplary and the particular set of tasks that may be appropriately handled by an embedded ASR engine and a server ASR engine may depend on the capabilities of the ASR engines in a specific implementation.

One scenario in which server ASR processing may be desired is when the input speech received by the device includes words in multiple languages. Due to limitations in computational power and memory available in some mobile electronic devices, ASR performed on mobile devices is typically restricted to supporting a single selected language at a time. For example, an embedded ASR engine configured to recognize German may have a difficult time accurately recognizing English speech. Additionally, multilingual utterances such as "Play Je ne regretted rien by Die Dri Tenöre" pose particular challenges for resource-constrained ASR on mobile devices. Some embodiments are directed to providing hybrid ASR support for multiple language input speech and/or provide for multilingual utterances received by a mobile electronic device in a hybrid ASR system by performing a language identification process based on the received input speech and/or output of the embedded ASR engine.

FIG. 2 illustrates a process for performing multiple language processing in a hybrid ASR system in accordance with some embodiments. In act 210 speech is received by a speech-enabled mobile electronic device in a hybrid ASR system. The received speech may be encoded or otherwise processed prior to storage and/or recognition on the electronic device. The process then proceeds to act 212, where the encoded speech is processed by an embedded ASR engine using acoustic and/or language models configured for recognition in a first language. The first language in which recognition is performed may be selected by a user via, for example, a user interface provided by the mobile device. Alternatively, the first language may be selected automatically by the mobile device based, at least in part, on an analysis of the received speech and/or ASR settings configured for recognition of recent utterances.

The process then proceeds to act 214, where a language identification process determines that at least a portion of the input speech corresponds to speech in a second language different from the first language in which the ASR is configured to perform speech recognition. One or more controllers included in a mobile electronic device may be configured to determine whether to send information to a server ASR engine for processing based, at least in part, on the output of the language identification process.

In some embodiments, the language identification process operates on the raw or encoded input speech to determine that at least a portion of the input speech includes speech in the second language. For example, the input speech may be analyzed by a language identification module to detect a mismatch between the currently selected language for ASR (i.e., the first language) and a language determined for the input speech (i.e., the second language). The language identification module may be configured to analyze all input speech or alternatively, the language identification module may be configured to analyze input speech only when certain conditions are met. For example, the language identification module may be configured to analyze input speech only when a confidence score associated with ASR results output from the embedded ASR engine is lower than a threshold value.

In some embodiments, the language identification process may operate as part of the ASR processing performed by the embedded ASR engine rather than being a separate process implemented by a language identification module, as just described. In one implementation, one or more models or dictionaries used by the embedded ASR engine are adapted to enable the embedded ASR engine to recognize words in multiple languages. For example, an acoustic/language model or dictionary used to recognize German speech may be augmented with information for one or more English words to enable the embedded ASR engine to recognize those English words. As an example, the English words "the" or "the Beatles" may be added to the German recognition vocabulary used by the embedded ASR engine, and recognition of one of the English words may indicate to a controller of the mobile device that the speech possibly relates to selecting an English movie or song title. In response, the controller may determine that the task of recognizing the English movie or song title may be better handled by the server ASR.

Upon determining that the input speech includes at least one word in a language other than the language for which the embedded ASR engine is currently configured to recognize, the process of FIG. 2 continues to act 216, where information including at least a portion of the input speech is transmitted to a remote server in the hybrid ASR system for processing. The information transmitted to the server for processing may include information other than speech input. For example, in the scenarios described above in which multiple languages are detected in the speech input, the information transmitted to the server may include an indication that a second language was detected. In some embodiments, the information may include an identification of the detected second language. Additionally, the information transmitted to the server may include at least a portion of ASR and/or NLU results generated by embedded processing on the mobile device.

The process then proceeds to act 218, where the server ASR engine processes at least a portion of the audio transmitted to the server from the mobile device. The server ASR engine may process the at least a portion of the audio based, at least in part, on the information transmitted to the server from the mobile device including, but not limited to, an identification of a language detected by the mobile device. Based on the language identification provided by the mobile device, the server ASR engine may be configured to perform speech recognition in the identified language by activating appropriate models or dictionaries for use in speech recognition of the audio. Alternatively, the server may independently perform a language identification process by processing the information received from the mobile device, and the server ASR engine may be configured to perform speech recognition in the language identified by the server.

The process then proceeds to act 220, where at least some of the server ASR results output from the server ASR engine are returned to the mobile electronic device. In some embodiments, the server ASR results may include recognized text and a confidence score associated with the recognized text. The process then proceeds to act 222, where at least some of the ASR results output from the embedded ASR engine and at least some of the ASR results output from the server ASR engine are combined and are provided to a user of the mobile device. The embedded and server ASR results may be combined in any suitable way, examples of which are described above. For example, text corresponding to portions of audio recognized in a first language by the embedded ASR engine may be combined with text corresponding to portions of audio recognized in a second language by the server ASR engine to provide a combined result. In some embodiments, how the ASR results are combined is based, at least in part, on confidence scores associated with the ASR results. For example, if it is determined that the confidence score associated with an embedded ASR result is lower than a threshold value, the combined ASR results may include only contributions from the text generated by the server ASR process.

The combined ASR results may be provided to a user of the mobile device in any suitable way. For example, the combined ASR results may be displayed on a user interface of the mobile device. Additionally or alternatively, the combined ASR results may be interpreted by the mobile device to perform one or more actions (e.g., playing a requested song or movie, initiating a web search, launching an application) without separately displaying the ASR results to the user. By virtue of the action(s) being performed, the user of the mobile device is made aware of the combined ASR results, and is thus provided with them.

As should be appreciated from the foregoing discussion, some embodiments are directed to analyzing input speech or at least a portion of the ASR results output from an embedded ASR engine in a hybrid ASR system to determine whether to send information including at least a portion of the input speech to a server ASR engine for recognition. In some embodiments, the decision of whether to send at least a portion of input speech to a server ASR for recognition may be based, at least in part, on NLU results output from an embedded NLU engine of a mobile electronic device.

As shown in FIG. 1, a mobile electronic device 102 may include an embedded NLU engine 110 arranged to perform NLU processing on at least a portion of the text output from embedded ASR engine 108. For example, the embedded NLU engine 110 may be configured to determine a semantic category associated with the text output and the decision of whether to send information to the server 130 for speech processing may be based, at least in part, on the determined semantic category.

FIG. 3 schematically illustrates a process for determining whether to send information from a mobile device to a server for processing based, at least in part, on a semantic category. In act 310, audio input comprising speech is received by a mobile electronic device in a hybrid speech processing system. The process then proceeds to act 312, where the received audio is processed by an embedded ASR engine to produce recognized text. In act 314, at least a portion of the recognized text output from the ASR engine is then processed by an embedded NLU engine to determine a semantic category associated with the recognized text. In some embodiments the embedded NLU engine may operate on partial ASR results output from the embedded ASR engine to determine the semantic category. Operating on partial ASR results enables the embedded NLU engine to quickly determine a semantic category based, for example, on a voice command included at the beginning of a user utterance. In other embodiments, the determined semantic category may be determined based on final ASR results.

After determining the semantic category associated with ASR results, the process of FIG. 3 proceeds to act 316 where it is determined whether to send information including at least a portion of input speech from the mobile device to a remote server for speech processing. Some embodiments store information describing whether network transmission and server ASR support is enabled for different semantic categories. The stored category information may be user configurable so that a user of the mobile electronic device can select the semantic categories for which server ASR support is enabled and which semantic categories are not associated with server ASR support.

The inventors have recognized that users of mobile devices may have privacy concerns with sending audio over a network to be recognized by a server ASR engine. Accordingly, some embodiments are directed to selectively sending audio to a server ASR engine for recognition based, at least in part, on user-selected privacy settings. In some implementations, the user may interact with a user interface presented on a mobile device to enable/disable categories of speech input for which sending information to a server ASR engine is allowed. Examples of user-configurable categories include, but are not limited to, navigation control, text messaging, web search, and media streaming. A user may determine that due to privacy concerns, navigation control and text messaging queries should be processed locally on the device only, whereas web search and media streaming queries may be sent to the server ASR engine for recognition. It should be appreciated that the above-described user selections are provided as examples only and other user selections are also possible. Providing the user with options to select which categories of speech input to send to an ASR server gives users of mobile devices more control over the hybrid ASR process. In some embodiments, some categories may be made available for configuration via a user interface, whereas other categories may not be user configurable.

Rather than requiring users to select particular categories for sending information to a server ASR engine for recognition, some embodiments enable a user to interact with a user interface provided on a mobile device to select general privacy settings that are not category specific. For example, a user may choose a "full privacy" setting that, when selected, prevents information (e.g., audio or embedded ASR results) from being transmitted to a server ASR engine for recognition at any time. Another user may select a "least privacy" setting that, when selected, always sends information to a server ASR engine for recognition in parallel with the embedded ASR engine. Yet another user may select an intermediate level of privacy setting that, when selected, results in information being sent to a server ASR engine only when certain criteria are met, examples of which are described above. For example, the mobile device may store information associating different categories of speech input with different levels of privacy, and information may be sent to the server ASR engine based, at least in part, on a determined category for speech input output from an embedded NLU engine, the stored information associating different categories of speech input with different levels of privacy, and the user-specified general privacy settings. Although only three types of general privacy settings are described, it should be appreciated that any number of types of general privacy settings may be used, and embodiments are not limited in this respect.

The user-specified privacy settings may be stored on the mobile electronic device and/or the privacy settings may be stored on a network-connected computer (e.g., a server) accessible to the mobile electronic device over one or more networks. In one embodiment, a user of the mobile electronic device may specify the privacy settings by interacting with a user interface of the mobile electronic device and the specified privacy settings may be transmitted to a network-connected server computer for storage. Subsequently, when the user uses another network-connected mobile electronic device, the privacy settings stored on the network-connected server may be retrieved and used by the another mobile electronic device in determining whether to send information to a server for processing in accordance with the techniques described herein. Although in some embodiments, the same privacy settings for a user may be used across all devices in communication with a network-connected server that stores the privacy settings, in other embodiments, a user may specify different privacy settings for different mobile electronic devices, and aspects of the invention are not limited in this respect.

Returning to the process of FIG. 3, in act 316, a controller of a mobile electronic device determines based, at least in part, on a semantic category associated with speech input, whether to transmit information (e.g., audio, ASR results) to a remote server for processing. As discussed above, the determination of whether to transmit the information to the server may be based, at least in part, user-selected privacy settings (e.g., general or category-specific) and output from an embedded NLU engine identifying a determined category associated with speech input. If it is determined in act 316 not to transmit information to the remote server, no server-based speech processing is performed and the process proceeds to act 324, where the local ASR/NLU results are provided to a user of the mobile device. Otherwise, if it is determined in act 316 to transmit information to the remote server, the process proceeds to act 318, where information (e.g., speech and/or ASR results) is transmitted from the mobile electronic device to a remote server for processing.

The process then proceeds to act 320, where the server performs ASR and/or NLU processing on audio received from the mobile electronic device. In some embodiments, the information received from the mobile device may include an indication of the semantic category determined by the embedded NLU engine of the mobile device, and the server may perform speech processing based, at least in part, on the indication of the semantic category. For example, the server ASR engine may select one or more models or dictionaries to use in performing speech recognition based on the identified semantic category received from the mobile device. The process then proceeds to act 322, where the server ASR and/or NLU results are returned to the mobile device from the server that performed the speech processing. In act 324, the ASR/NLU results from the embedded ASR/NLU engines are combined with the server ASR/NLU results from the server ASR/NLU engines and the combined output is provided to a user of the mobile device. Non-limiting examples of combining local and server speech processing results are described above, and are not repeated here for brevity.

In some embodiments, a controller configured to determine whether to send information to a remote server for processing is implemented by one or more computer processors on a mobile electronic device in a hybrid speech processing system. In other embodiments, the remote server also includes a controller configured to determine whether to send audio from the mobile device to the remote server for speech processing. The distributed controller architecture in such embodiments enables the server to decide when audio should be transmitted from the mobile device to the server, thereby preventing the audio from being transmitted to the server when it is not needed. The distributed controller architecture also provides for a thin client implementation of the controller to reduce the amount of processing required by the mobile device controller. Such a thin client implementation is particularly useful for implementation on mobile electronic devices that have limiting processing resources.

FIG. 4 illustrates a process for using a distributed controller architecture in accordance with some embodiments. In act 410, audio comprising speech is received by a mobile electronic device in a hybrid speech processing system. The process then proceeds to act 412, where at least a portion of the input speech is processed by an embedded ASR engine on the mobile device to generate recognized text. The process then proceeds to act 414, where at least a portion of the recognized text output from the embedded ASR engine is transmitted to a remote server in the hybrid speech processing system. The recognized text transmitted to the remote server may include partial or full ASR results, and embodiments are not limited in this respect. Transmitting recognized text to a remote server is shown in the process of FIG. 4 as an act that is always performed. However, it should be appreciated that in some embodiments, a controller implemented on the mobile device may be configured to determine from among multiple options, whether to transmit information to a remote server, where transmitting recognized text output from the embedded ASR engine to the server is one of the multiple options. As another option, the controller may be configured to determine that both audio and recognized text should be transmitted to the server for processing. In the rest of the process of FIG. 4 described below, it is assumed that recognized text was transmitted from the mobile device to the remote server prior to sending any audio to the remote server for processing and that a controller implemented on the server is configured to request the audio from the mobile device, if needed.

The process of FIG. 4 then proceeds to act 416, where a controller implemented on the server determines, based on the recognized text received from the mobile device, whether to request speech for processing from the mobile device. In some embodiments, at least a portion of the recognized text may be processed by a server NLU engine configured to determine a semantic category associated with the recognized text, and the server controller may be configured to determine whether to request the speech from the mobile device based, at least in part, on the determined semantic category. The server controller may be configured to determine whether to request speech from the mobile device for processing based, at least in part, on criteria other than a semantic category associated with the recognized text. For example, the server controller may be configured to request speech from the mobile device based, at least in part, on a confidence score associated with the recognized text indicating a confidence of the embedded ASR processing or a confidence score associated with NLU processing performed by an embedded NLU engine or a server NLU engine indicating a confidence that NLU processing was accurately performed.

If it is determined in act 416 not to request speech from the mobile device that transmitted the recognized text, the process proceeds to act 430 where remote NLU processing is optionally performed on the recognized text by a server NLU engine and if performed, the remote NLU results may be returned to the mobile device. If remote NLU processing is not performed, the process proceeds to act 426, where the local ASR/NLU results are provided to the user of the mobile device, as discussed above in connection with the processes of FIGS. 2 and 3.

If it is determined in act 416 that speech should be requested from the mobile device that transmitted the recognized text, the process proceeds to act 418, where the controller implemented on the server initiates a request to the mobile device to transmit the speech associated with the recognized text for processing by the server ASR engine. The process then proceeds to act 420 where, in response to issuing the request to the mobile device for the speech, the speech is received from the mobile device for processing. The process then proceeds to act 422 where server ASR and/or NLU processing is performed based, at least in part, on the received speech, and the server ASR/NLU results are returned to the mobile device in act 424. The process then proceeds to act 426, where the combined ASR/NLU results are provided to a user of the mobile device as discussed in connection with the processes of FIGS. 2 and 3.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A server comprising:
a controller configured to:
receive, at the server, text and a confidence score associated with the text from a mobile electronic device remotely located from the server, the text comprising a result of an embedded speech recognizer of the mobile electronic device performing speech recognition on audio data associated with the text;
evaluate, at the server, the text received from the mobile electronic device;
determine, at the server, that the confidence score associated with the text does not exceed a threshold, wherein the confidence score indicates a confidence in the accuracy of the speech recognition performed by the embedded speech recognizer of the mobile electronic device; and
request, from the mobile electronic device, the audio data associated with the text in response to determining that the confidence score does not exceed the threshold.

2. The server of claim 1, further comprising:
a natural language understanding (NLU) engine configured to process at least a portion of the text received from the mobile electronic device to generate an NLU result, wherein the controller is configured to determine whether to request the audio comprising the speech based, at least in part, on the NLU result.

3. The server of claim 2, further comprising:
at least one storage device configured to store semantic category information, wherein the NLU result is a semantic category associated with the text, and wherein the controller is configured to determine whether to request the audio comprising the speech based, at least in part, on a comparison of the semantic category associated with the text and the stored semantic category information.

4. The server of claim 1, wherein the controller is configured to determine whether to request the audio comprising the speech based, at least in part, on semantic category information received from the mobile electronic device.

5. The server of claim 1, wherein the controller is further configured to:
receive from the mobile electronic device the text generated by the embedded speech recognizer at the mobile electronic device.

6. The server of claim 5, wherein the controller is further configured to:
perform speech recognition on the text, received from the mobile electronic device to produce recognized text; and
send the recognized text to the mobile electronic device.

7. The server of claim 1, wherein the controller is further configured to:
receive, from the mobile electronic device, an indication that a second language is detected in the speech that is different from a first language corresponding to the text received; and
determine to request the audio comprising the speech based at least in part on the indication of the second language detected.

8. A method comprising:
receiving, by a processor in a server, text and a confidence score associated with the text from a mobile electronic device remotely located from the processor, the text comprising a result of an embedded speech recognizer of the mobile electronic device performing speech recognition on audio data associated with the text;
evaluating, by the processor, the text received from the mobile electronic device;
determining, by the processor, that the confidence score associated with the text does not exceed a threshold, wherein the confidence score indicates a confidence in the accuracy of the speech recognition performed by the embedded speech recognizer of the mobile electronic device; and requesting, from the mobile electronic device, the audio data associated with the text in response to determining that the confidence score does not exceed the threshold.

9. The method of claim 8, further comprising:

processing, by a natural language understanding (NLU) engine at a server associated with the processor, at least a portion of the text received from the mobile electronic device to generate an NLU result; and wherein determining whether to request the audio comprising the speech is based, at least in part, on the NLU result.

10. The method of claim 9, wherein:

the NLU result is a semantic category associated with the text; and wherein determining whether to request the audio comprising the speech is based, at least in part, on a comparison of the semantic category associated with the text and stored semantic category information.

11. The method of claim 8, wherein determining whether to request the audio comprising the speech is based, at least in part, on semantic category information received from the mobile electronic device.

12. The method of claim 8, further comprising:

receiving, from the mobile electronic device, an indication that a second language is detected in the speech that is different from a first language corresponding to the text received; and determining to request the audio comprising the speech based at least in part on the indication of the second language detected.

13. The method of claim 8, further comprising:

receiving from the mobile electronic device the text generated by the embedded speech recognizer at the mobile electronic device based on performance, by the embedded speech recognizer, of the speech recognition on the audio comprising the speech.

14. The method of claim 8, further comprising:

processing at least a portion of the text received from the mobile electronic device to generate a natural language understanding (NLU) result, wherein the confidence score is at least partially based on the NLU result.

15. The method of claim 14, further comprising:

storing semantic category information, wherein the NLU result is a semantic category associated with the text, and wherein the confidence score is based, at least in part, on a comparison of the semantic category associated with the text and the stored semantic category information.

16. The method of claim 8, wherein the confidence score is based, at least in part, on semantic category information received from the mobile electronic device.

17. The method of claim 8, further comprising:

receiving from the mobile electronic device the text generated by the embedded speech recognizer at the mobile electronic device.

18. The method of claim 17, further comprising:

performing speech recognition on the text received from the mobile electronic device to produce recognized text; and sending the recognized text to the mobile electronic device.

19. The method of claim 8, further comprising:

receiving, from the mobile electronic device, an indication that a second language is detected in the speech that is different from a first language corresponding to the text received; and determining to request the audio comprising the speech based at least in part on the indication of the second language detected.

20. A non-transitory computer-readable storage medium having encoded thereon executable instructions that, when executed by a processor of a server, cause the processor to:

receive, at the server, text and a confidence score associated with the text from a mobile electronic device remotely located from the server, the text comprising a result of an embedded speech recognizer of the mobile electronic device performing speech recognition on audio data associated with the text;

evaluate, at the server, the text received from the mobile electronic device;

determine, at the server, that the confidence score associated with the text does not exceed a threshold, wherein the confidence score indicates a confidence in the accuracy of the speech recognition performed by the embedded speech recognizer of the mobile electronic device; and request, from the mobile electronic device, the audio data associated with the text in response to determining that the confidence score does not exceed the threshold.

* * * * *